United States Patent [19]

Corma et al.

[11] Patent Number: 4,542,002
[45] Date of Patent: Sep. 17, 1985

[54] SILICATES WITH HIGH ION EXCHANGE CAPACITY DERIVED FROM SEPIOLITE AND PROCESSES FOR THEIR PRODUCTION

[75] Inventors: Avelino C. Corma; Amparo C. Mifsud; Joaquin P. Perez, all of Madrid, Spain

[73] Assignee: Synthesis Engineering Ltd., Canada

[21] Appl. No.: 470,601

[22] Filed: Feb. 28, 1983

[30] Foreign Application Priority Data

Mar. 1, 1982 [ES] Spain .................................... 510013

[51] Int. Cl.$^4$ ............................................. C01B 33/24
[52] U.S. Cl. .................................... 423/331; 423/326; 423/327; 423/332; 502/11
[58] Field of Search ............... 423/326, 327, 331, 332, 423/118; 502/11

[56] References Cited

U.S. PATENT DOCUMENTS 3,428,568  2/1969  Harker et al. ........................ 502/11
4,169,774  10/1979  Kadija et al. ......................... 204/98
4,469,807  9/1984  Audeh et al. ......................... 502/74

OTHER PUBLICATIONS

Harker R. J. et al, Abstract of U.S. Pat. No. 3,428,568, Chem. Abstracts 100044f, p. 272, vol. 70, 1969.
Frank-Kamenetskii, V. A. et al, Phase Transformations of Sepiolite and Polygorskite under Pressure and Hydrothermal Conditions in the Presence of Potassium and Sodium Chlorides, Chem. Abstracts 24182q, p. 83, vol. 74, 1971.
Vlasov V. V. et al, Interaction of Day Minerals and Some Layered Silicates with Alkalies, Chem. Abstracts 110822b, p. 10387, vol. 69, 1968.
Fahey J. J. et al, Loughlinite, A New Hydrous Sodium Magnesium Silicate, The American Mineralogist, pp. 270-281, vol. 15, Mar., Apr. 1960.
Rautureau M. et al, Cristallochimie-Analyse Structural de la Sepiolite par Microdiffraction Electronique, C. R. Acad. Sc. Paris, +274, pp. 269-271, (Jan. 17, 1972).
Rautureau M. et al, Analyse Structural de la Sepiolite a Partir des Donnees de la Diffraction Electronique Procs., 1972 International Clay Conference, pp. 115-121.
Anton Preisinger, Sepiolite and Related Compounds: Its Stability and Application, Mineralogishes Institut, Universitat Wien, Vienna, Austria, pp. 365-371.
Wolfram Echle, The Transformations Sepiolite-Loughlinite: Experiments and Field Observations, N. Jb. Miner. Abh. 133 3 pp. 303-321, Nov. 1978.
Michel Rautureau, Analyse Structurale de la Sepiolite Par Microdiffraction Electronique Relations Avec Les Proprietes Physico-Chimiques, presented at A L'Universite D'Orleans, Jul. 8, 1974, pp. 1-72.

Primary Examiner—Gary P. Straub
Assistant Examiner—Jackson Leeds
Attorney, Agent, or Firm—Bacon & Thomas

[57] ABSTRACT

Silicate having high ion exchange capacity are obtained by reacting sepiolites with a base, preferably a strong base in the presence of a polar liquid at a temperature, preferably elevated, and for a period sufficient to increase the ion exchange capacity to at least 50 meq. per 100 g, more preferably at least 100 meq. per 100 g. In the preferred form, the reaction is carried out at above 100° C. in an autoclave.

20 Claims, No Drawings

SILICATES WITH HIGH ION EXCHANGE CAPACITY DERIVED FROM SEPIOLITE AND PROCESSES FOR THEIR PRODUCTION

Sepiolite is a fibrous talc-like mineral, the constituents of which are arranged in such a way that it contains parallel channels in a fibrous crystalline structure. The most commonly occuring form is as a natural hydrated magnesium silicate whose mineralogical formula is:

$$Si_{12}Mg_8(OH)_4O_{30}(H_2O)_4.8H_2O$$

The structure of sepiolite was determined in 1956 by Brauner and Preisinger (Miner.Petr.Mitt. 1956,6,120), from X-ray diffraction data and later refined from data on electron diffraction. (Rautureau M. Doctoral Thesis Univ. de Orleans, France, 1974).

Because sepiolites are basically magnesium silicates they can undergo isomorphic substitutions. Thus, for example, there are known substitutions of $Fe^{+3}$ for $Mg^{+2}$ together with a substitution of $Fe^{+3}$ for $Si^{+4}$. Alumino sepiolites are also known in which silicon is replaced by aluminium at the same time as a magnesium in an octahedral position is replaced by aluminium, so that electroneutrality can be maintained. Furthermore, nickel and manganese sepiolites are also known. In the case of aluminum sepiolites, various authors have reported from chemical analysis that the quantity of tetrahedral aluminium varies between 0.04 and 0.48 for each two tetrahedral locations. The small charge deficiency thus created is internally compensated for by cations which are responsible for a small observed exchange capacity. This small exchange capacity of a natural sepiolite is due largely to charge deficiencies which exist on the external surface, along edges and defects.

The sepiolites are found in large quantities in Spain and the Western United States and are used in large quantities in purification of liquids and as adsorbants because of their large specific surface area. As adsorbants they have utility for the elimination of cations in aqueous solutions. It is clear that their usefulness in this and many other applications would be greatly increased if one could produce a sepiolite with higher exchange capacity.

It is to this end that the present application is addressed.

In this application we describe a procedure which may allow the conversion of natural sepiolites whose exchange capacity is generally in the order of 20 meq.:100 grams into sepiolites with an increased exchange capacity of 200 or more meq. per 100 grams.

The present invention provides a process for obtaining a silicate derived from a sepiolite comprising reacting said sepiolite with a base in a polar liquid at a temperature and for a period sufficient to substantially increase the ion exchange capacity of the sepiolite, and recovering a silicate with an increased ion exchange capacity.

Desirably, the base is a strong base, the reaction is conducted at elevated temperature, and the reaction is conducted for a more or less prolonged period. It has been found that, the stronger the base, the higher the temperature of reaction, the greater is at least the initial rate of conversion of the naturally-occurring material of relatively low ion exchange capacity into a silicate product having a relatively high ion exchange capacity. As examples of bases which may be employed in the process, there may be mentioned hydroxides of alkaline metals, alkaline earth metals, ammonia, and of transition element metals. As noted above, desirably the base is a strong base, and in the preferred form, the base is an alkali metal hydroxide. In order to reduce the length of time for which the reaction needs to be conducted, the reaction is preferably conducted at a temperature of at least about 20° C. At this temperature, however, prolonged reaction times of many days e.g. 20 days may be required in order to achieve an appreciable increase in the exchange capacity of the sepiolite. Desirably, much higher temperatures are employed in order to significantly reduce the reaction time. Desirably, the reaction is conducted at an elevated temperature up to about 400° C., more preferably in the range about 100° C. to about 200° C. for a period sufficient to increase the ion exchange capacity of the silicate to a level of at least about 50 meq. per 100 g, more preferably at least about 100 meq. per 100 g. Where the reaction temperature is above the boiling point of the polar liquid, the reaction is conducted in an autoclave. In the preferred form, the polar liquid is water, and the reaction is conducted in an autoclave at a temperature about 100° C. up to about 200° C.

In the preferred form, the polar liquid is water or an alcohol e.g. ethyl alcohol.

Where the sepiolite is reacted with concentrated solutions of strong bases at extremely high temperatures, an appreciable increase in the exchange capacity of the material may be achievable in short times of about 5 minutes, but under the more usual reaction conditions, the reaction is conducted for a period of between about 2 hours and 8 days.

In the preferred form, the reaction mixture contains a weight ratio of the sepiolite to the polar liquid of between about 0.01:1 and about 1:1, more preferably about 0.05:1 and about 0.5:1, the base is a basic metal hydroxide, and the weight ratio of the sepiolite to the hydroxide is between about 0.25:1 and about 14:1, more preferably between about 1.5:1 and about 15:1.

The reaction mixture may also contain a small quantity of an alkaline-reacting carbonate of an alkali metal, an alkali earth metal, of ammonia, or of a transition element.

A more rapid reaction of the sepiolite to an increased ion exchange capacity may be achievable by pretreating the sepiolite material with a mineral inorganic or an inorganic acid, or with ammonium salts or with EDTA (ethylene diamine tetraacetic acid). Such pretreatment may be conducted at a temperature between 10° to 100° C., more preferably between 20° and 80° C., at a weight ratio between the sepiolite and the solution of the acidic pretreatment agent between 0.1:1 and 2:1, more preferably between 0.2:1 and 1:1, with the concentration of the acidic pretreatment agent in the solution being between about 0.05 and 6 molar, more preferably between 0.1 and 4 molar, and for a reaction time between 10 minutes and 24 hours, more preferably between 30 minutes and 10 hours.

After the acid treatment, the pre-treated sepiolite is washed and dried, and the resulting sepiolite is subjected to the treatment with a base previously described.

The composition and exchange capacity of the final silicate material depends on the composition of the reaction mixture used in its preparation.

After the treatment with the base, the final solid silicate product is preferably recovered in purified form.

The purification procedure may comprise separation of the final solid product from the reaction mixture by filtration at ambient temperature, and washing the filtered product with water. The solid may then be dried out, for example, 110° C. for a period of between 3 and 24 hours. Milder conditions may be used for drying, such as ambient temperature and drying under vacuum.

One preferred class of the silicate products obtained with the present process consists of substantially pure silicates having an ion exchange capacity of at least about 50 meq. per 100 grams, with respect to potassium or magnesium more preferably at least about 100 meq. per 100 g, and conforming to the general formula:

$$Si_yW_wM_xA_zO_{30}(OH)_4$$

wherein
W is selected from the group consisting of aluminum, magnesium, iron, nickel, manganese and mixtures thereof;
M is a divalent metal selected from the group consisting of the alkaline earth metals and magnesium, and mixtures thereof;
A is selected from the group consisting of alkali metals, ammonium ion and mixtures thereof;
y is from about 10 to about 12;
w is from about 3.5 to about 8;
x is from about 0 to about 2;
z is from greater than zero up to about 4; and
the molar ratio w:y is from about 0.29:1 up to about 0.8:1.

In the preferred form, A is an alkali metal, more preferably sodium, and z is from about 1 to about 2.

Described below is a sodium form, in which A in the above formula is Na, and a nickel form, in which W in the above formula is Ni.

As will be appreciated such silicate products can be obtained from the above process wherein the starting material is a magnesium silicate or a substituted magnesium silicate having some of its magnesium or its silicon, or both, replaced by other W and M atoms, and wherein an alkali metal-, alkaline earth metal- or ammonium group-containing base is employed thus introducing an M or A ion into the product.

In the silicate material product, the cations M, A, and some of the W may be exchangable with other cations such as those of alkali metals, alkaline earth metals, transition metals such as Ni, Cu, Co, Pt, Pd, Rh, Ru, Ir, Fe, Zn, Cr, and Ag, and of rare earth metals. Apart from their usefulness as ion exchange materials, the products of the invention, having a content of a catalyst metal which may be introduced by ion exchange, may be useful as catalyst materials.

The X-ray diffraction patterns of the product vary with the nature of the cation M, and in each case are different from those of the natural sepiolite. Thus, for example, in the following Table are presented the d values of the most important reflections of a natural sepiolite from Vallecas in Spain and those of the same sepiolite after treatment in accordance with the invention and after exchange with Na and Ni and calcination at 250° C.

| 2θ | d(Å) | I$_{obs.}$ | hkl |
|---|---|---|---|
| Natural Sepiolite | | | |
| 7.24 | 12.19 | ms | 110 |
| 11.60 | 7.62 | w | 130 |
| 13.00 | 6.80 | w | 200,040 |
| 17.60 | 5.03 | w | 150 |
| 19.70 | 4.50 | i | 060 |
| 20.54 | 4.32 | i | 131 |
| 23.70 | 3.75 | i | 260 |
| 25.10 | 3.54 | w | 241 |
| 26.54 | 3.35 | i | 080 |
| 28.00 | 3.18 | i | 331 |
| 36.60 | 2.45 | i | 202,042 |
| Sodium Sepiolite | | | |
| 6.9 | 12.80 | s | 110 |
| 19.7 | 4.50 | w | 060 |
| 20.4 | 4.34 | i | 131 |
| 26.5 | 3.35 | i | 080 |
| 34.4 | 2.60 | w | 441,281 |
| 35.2 | 2.54 | w | 371,191 |
| 36.5 | 2.45 | w | 202,042 |
| Nickel Sepiolite | | | |
| 7.10 | 12.44 | s | 110 |
| 17.54 | 5.05 | w | 150 |
| 19.64 | 4.51 | i | 060 |
| 20.50 | 4.32 | i | 131 |
| 23.60 | 3.76 | w | 260 |
| 26.46 | 3.36 | i | 080 |
| 27.70 | 3.21 | w | 331 |
| 34.60 | 2.59 | i | 371,191 |
| 36.50 | 2.45 | w | 202,042 |

The above diffractions were obtained using Cu K alpha radiation, Ni for filtration, and a crystal of muscovite mica as an internal standard. In the Table, the relative intensities are presented as: ms=strongest, s=strong, i=intermediate and w=weak.

The examples given below illustrate some possible forms of the invention, without limiting its generality.

EXAMPLE 1

To 80 ml. of a 2 molar solution of sodium hydroxide, 8 grams of natural sepiolite were added. The mixture was raised to 220° C. in 30 minutes in a stirred autoclave. The mixture was held at this temperature for 4 hours and then cooled to ambient temperature. The solid was washed with decationized water and dried at 110° C. for 20 hours. A gram of this material was placed in 10 ml. of a 0.6 molar solution of potassium chloride, stirred at ambient temperature, filtered and washed with decationized water, dried at 110° C. for 20 hours and exchanged again. The total quantity of potassium which can be exchanged into the material in this way is 205 meq.:100 grams.

EXAMPLE 2

2 grams of natural sepiolite were added to 80 ml. of a solution which contained 3.2 grams of NaOH and 0.03 grams of sodium carbonate. The mixture was heated to 120° C. in 15 minutes in an agitated autoclave and maintained at 120° C. for 6 hours. Finally, the mixture was cooled to ambient temperature, the solids filtered and washed with decationized water and dried at 110° C. for 20 hours. A gram of this product was placed in contact with 10 ml. of a 0.6 molar solution of potassium chloride, stirred at ambient temperature and the filtrate washed with decationized water and then dried for 20 hours at 110° C. The dried material was calcined for 3 hours at 250° C. and exchanged again with the potassium chloride. The total quantity of potassium which could be exchanged in this way is 190 meq.:100 grams.

EXAMPLE 3

2 grams of natural sepiolite were added to an aqueous solution of 1N HCl in the proportion of 4 parts by weight of solution to 1 of sepiolite and stirred for 3.5 hours. The solid was filtered, washed and dried at 110° C. for 10 hours. Next the solid was treated with a solution of 1N NaOH at the ratio of 10 parts by weight of liquid to 1 of solid and a temperature of 200° C. for 4 hours. The solid was filtered, washed and dried as before. The product was then calcined at 250° C. and exchanged with potassium chloride. The total exchange capacity for potassium was 170 meq.:100 grams.

EXAMPLE 4

2 grams of natural sepiolite were added to 120 ml. of an aqueous solution containing 4.8 grams of NaOH. The mixture was raised to 200° C. in 30 minutes and maintained at that temperature for 6 hours with stirring. Heating was discontinued at that time and stirring was continued for 15 hours. The product was filtered, washed and dried at 110° C. for 6 hours. Next the product was calcined at 250° C. for 3 hours. This product had a nickel exchange capacity of 220 meq.:100 grams.

EXAMPLE 5

A sample of sepiolite was treated under the same conditions as in Example 4, washed and dried at 110° C. for 10 hours and finally exchanged with a solution of 1N hydrochloric acid. The exchange capacity for protons was 196 meq.:100 grams.

EXAMPLE 6

A silicate prepared as in Example 4 was calcined at 250° C. for 3 hours and exchanged with a solution of magnesium at ambient temperature. The exchange capacity for magnesium was 205 meq.:100 grams.

We claim:

1. A process for obtaining a silicate derived from a sepiolite comprising reacting said sepiolite with a base selected from the group consisting of alkali metal hydroxides, alkaline earth metal hydroxides and ammonium hydroxide, in the presence of a polar liquid selected from the group consisting of water, alcohols and mixtures thereof, at a temperature in the range from about 100° C. to about 400° C. and for a period sufficient to increase the ion exchange capacity of the sepiolite to at least 100 meq. per 100 g with respect to potassium or magnesium, and recovering a silicate with said ion exchange capacity.

2. A process as claimed in claim 1 wherein the base is an alkali metal hydroxide.

3. A process as claimed in claim 1 wherein the weight ratio of sepiolite to polar liquid is between about 0.01:1 and about 1:1, and the weight ratio of sepiolite to said hydroxide is between about 0.25:1 and about 40:1.

4. A process as claimed in claim 3 wherein the weight ratio of sepiolite to polar liquid is between about 0.05:1 and about 0.5:1 and the weight ratio of sepiolite to said hydroxide is between about 1.5:1 and about 15:1.

5. A process as claimed in claim 1 wherein said temperature is about 100° C. to about 200° C.

6. A process as claimed in claim 1 carried out above the boiling point of the polar liquid in an autoclave.

7. A process as claimed in claim 1 wherein the reaction time is between about 5 minutes and about 20 days.

8. A process as claimed in claim 7 wherein said time is about 2 hours to about 8 days.

9. A process as claimed in claim 1 carried out in the presence of agitation.

10. A process as claimed in claim 1 carried out in the presence of a member selected from the group consisting of alkali metal carbonates, alkaline earth metal carbonates, alkaline earth metal carbonates, and ammonium carbonate, said member being added to the reaction mixture.

11. A process as claimed in claim 1 carried out in an agitated batch reactor.

12. A process as claimed in claim 1 wherein the starting material sepiolite is a natural sepiolite pretreated with a pretreatment agent selected from the group consisting of mineral acids, organic acids and ammonium salts.

13. A process as claimed in claim 1 including the steps of filtering, washing and calcining the product silicate.

14. A silicate having an ion exchange capacity with respect to magnesium of at least about 100 meq. per 100 g and conforming to the general formula $$Si_yW_wM_xA_zO_{30}(OH)_4$$

wherein

W is selected from the group consisting of aluminum, magnesium, iron, nickel, manganese and mixtures thereof;

M is a divalent metal selected from the group consisting of the alkaline earth metals, and mixtures thereof;

A is selected from the group consisting of alkali metals, ammonium ion and mixtures thereof;

y is from about 10 to about 12;

w is from about 3.5 to about 8;

x is from about 0 to about 2;

z is from greater than zero up to about 4; and the molar ratio w:y is from about 0.29:1 up to about 0.8:1.

15. A silicate as claimed in claim 14 wherein A is an alkali metal.

16. A silicate as claimed in claim 15 wherein A is sodium.

17. A silicate as claimed in claim 14 wherein z is from about 1 to about 2.

18. A silicate in sodium form having been calcined at 250° C. and having the formula $Si_yW_xM_xNa_zO_{30}(OH)_4$, wherein W is selected from the group consisting of aluminum, magnesium, iron, nickel, manganese and mixtures thereof; M is a divalent metal selected from the group consisting of alkaline earth metals, and mixtures thereof; y is from about 10 to about 12, w is from about 3.5 to about 8; x is from about 0 to about 2; and z is from greater than zero up to about 4; and having the following X-ray difractogram:

| 2θ | d(A) | $I_{obs}$ | hkl |
|------|-------|-----|---------|
| 6.9 | 12.80 | s | 110 |
| 19.7 | 4.50 | w | 060 |
| 20.4 | 4.34 | i | 131 |
| 26.5 | 3.35 | i | 080 |
| 34.4 | 2.60 | w | 441,281 |
| 35.2 | 2.54 | w | 371,191 |
| 36.5 | 2.45 | w | 202,042 | wherein the relative intensities are ms=strongest, s=strong, i=intermediate and w=weak.

19. A silicate in nickel form having been calcined at 250° C. and having the formula $Si_yNi_wM_xA_zO_{30}(OH)_4$, wherein M is a divalent metal selected from the group consisting of alkaline earth metals, and mixtures thereof; A is selected from the group consisting of alkali metals, ammonium ion and mixtures thereof; y is from about 10 to about 12, w is from about 3.5 to about 8, x is from about 0 to about 2, and z is from greater than zero up to about 4, and having the following X-ray difractogram:

| 2θ | d(A) | $I_{obs}$ | hkl |
|---|---|---|---|
| 7.10 | 12.44 | s | 110 |// continued
| 17.54 | 5.05 | w | 150 |
| 19.64 | 4.51 | i | 060 |
| 20.50 | 4.32 | i | 131 |
| 23.60 | 3.76 | w | 260 |
| 26.46 | 3.36 | i | 080 |
| 27.70 | 3.21 | w | 331 |
| 34.60 | 2.59 | i | 371,191 |
| 36.50 | 2.45 | w | 202,042 | wherein the relative intensities are ms=strongest, s=strong, i=intermediate and w=weak.

20. A process as claimed in claim 12 wherein said pretreatment agent is EDTA.

* * * * *